Aug. 14, 1962   C. W. THORNHILL ET AL   3,049,140
AUTOMATIC HIGH-LOW PRESSURE CUT-OFF VALVE
Filed May 18, 1959   2 Sheets-Sheet 1

Charles W. Thornhill
Obert L. Nordin
George D. Hall
INVENTORS

BY J. Vincent Martin
Joe E Edwards
M H Gay
ATTORNEYS

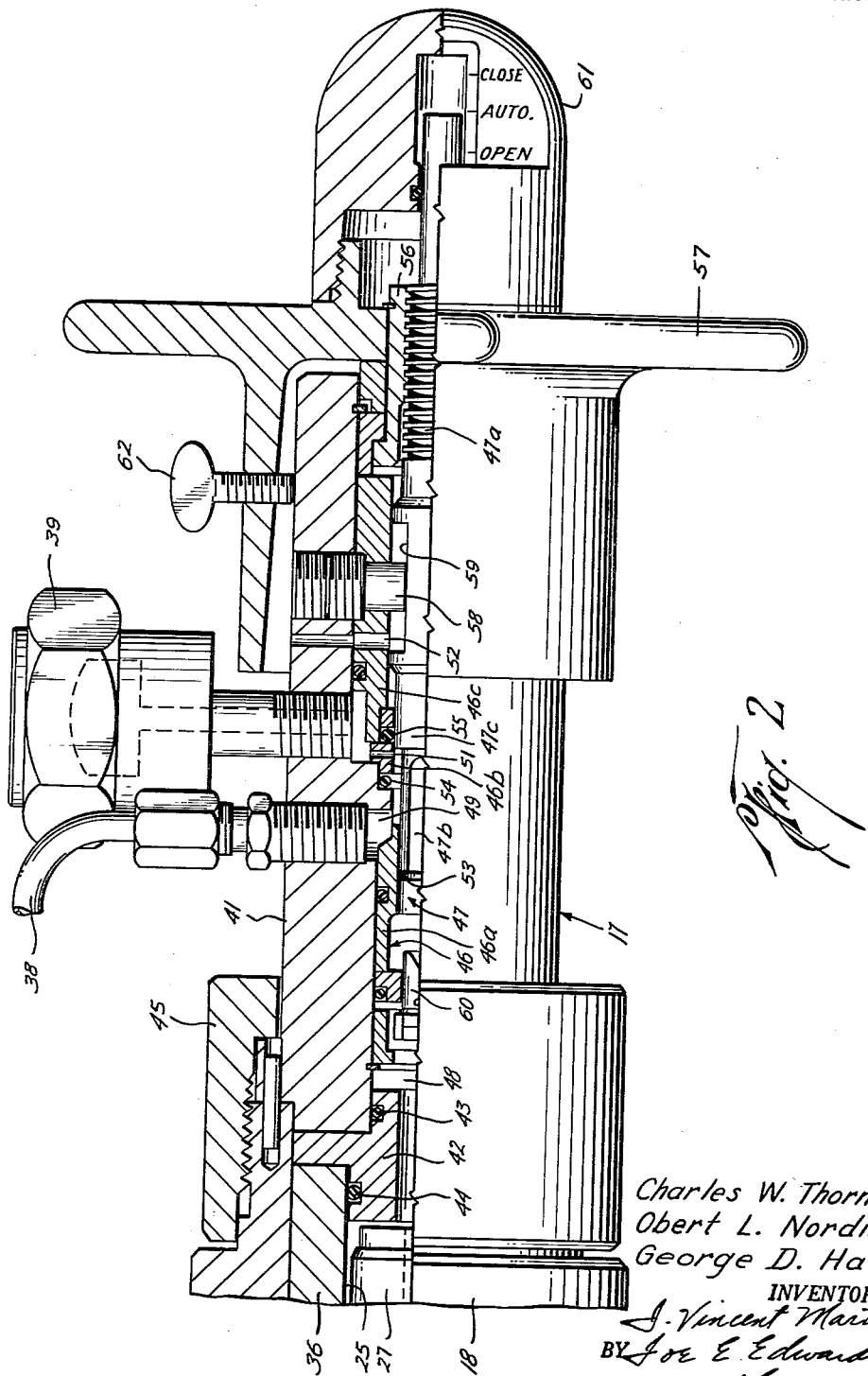

United States Patent Office 3,049,140
Patented Aug. 14, 1962

3,049,140
AUTOMATIC HIGH-LOW PRESSURE CUT-OFF
VALVE
Charles W. Thornhill, George D. Hall, and Obert L. Nordin, Houston, Tex., assignors to Thornhill-Craver Company, Houston, Tex., a corporation of Texas
Filed May 18, 1959, Ser. No. 814,093
9 Claims. (Cl. 137—68)

This invention relates to automatic valves, and more particularly to automatic shut-off valves for pipe lines.

It is customary with petroleum pipelines to take a pressure reduction in the pipeline adjacent the well head to protect the downstream line against full well pressure. In the event of a line breakage or "freezing" due to hydrate buildup, it is desirable to have a safety control valve in the line upstream of the point of pressure reduction to close the line adjacent the well head.

A control valve for this service is shown in the patent to Thornhill No. 2,684,688 issued July 27, 1954. This invention is an improvement in valves of the type shown in the Thornhill patent.

It is an object of this invention to provide a control valve apparatus in which a main valve is automatically controlled by a fluid motor operated by upstream pressure and pressure relief means, with a pilot valve which will effect opening or closing of the main valve and return to automatic operation without subjecting the relief means to upstream pressure.

Another object is to provide a simple, rugged, slide-type pilot valve for a fluid motor-operated control valve.

Another object is to provide a pilot valve for the motor operator of a control valve which may be operated by remote control to place the control valve on automatic operation or to open or close the control valve.

Other objects, features and advantages of this invention will be apparent from the drawings, specification and claims.

In the drawings, wherein embodiments of this invention are shown, and wherein like numerals indicate like parts:

FIGURE 2 is a view partly in elevation and partly in cross section of a segment of the valve of FIGURE 1 on an enlarged scale.

Figure 1:
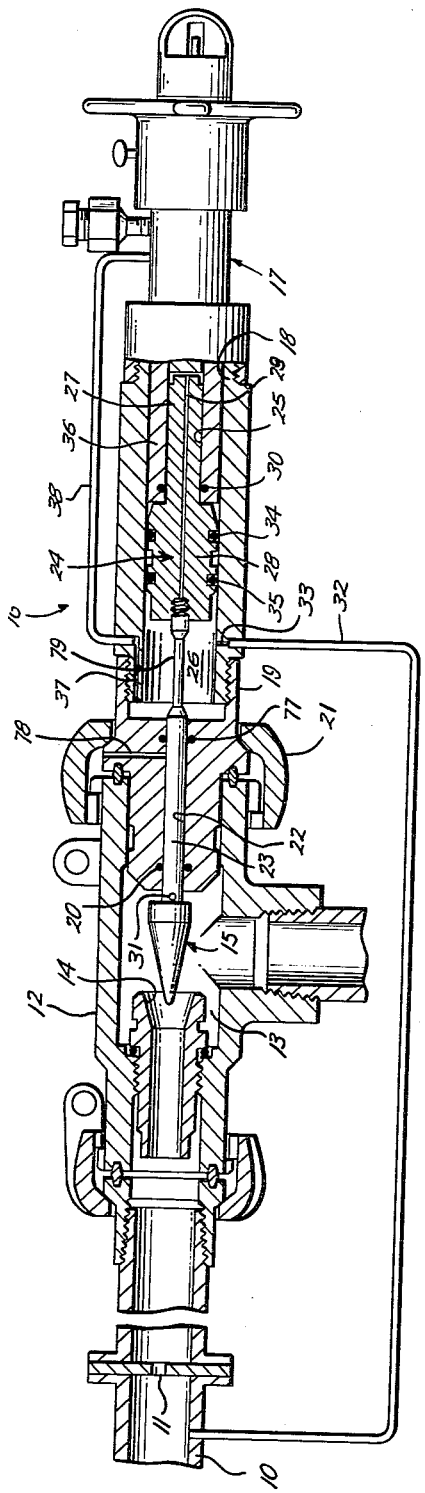
FIGURE 1 is a view partly in elevation and partly in cross section through an apparatus embodying this invention.

Referring to FIGURE 1, the line to be controlled is shown at 10 and has a restriction 11 therein. The valve of this invention is interposed in the line upstream of the restriction 11 and includes a valve body 12 having a flow passageway 13 therethrough controlled by a valve seat 14 and a valve member 15.

The valve member 15 is controlled by a fluid motor indicated generally at 16. On top of the fluid motor is a pilot control indicated generally at 17 which may be positioned to set the fluid motor for automatic operation, or which may be positioned to either open or close the main valve.

The fluid motor includes a fluid motor body 18 which is secured through an adapter 19 to the main valve body 12 by a nut 21. The adapter 19 has a bore 22 therethrough which establishes communication between the interior of the main valve body and the interior of the motor body 16. An operating stem 23 extends through the bore 22 and connects the main valve 15 with the fluid motor operator indicated generally at 24. Suitable seal means 20 seal between the valve stem and adapter 19.

The fluid motor operator includes first and second fluid chambers 25 and 26. The chamber 25 has a movable wall defined by the piston 27. In like manner the chamber 26 has a movable wall defined by a piston 28. These two pistons are connected to each other and are connected to the valve stem 23 so that the two pistons and valve member move together.

The first chamber 25 is exposed to upstream pressure by a passageway 29 which begins at 31 in the valve stem and extends through the valve stem and pistons 28 and 27 to the upper end of piston 27.

The chamber 26 is supplied with pressure from a point downstream of restriction 11 through line 32. A suitable restriction 33 is provided at the opening of line 3′ into chamber 26.

It will be noted that the piston 28 is provided with spaced seals 34 and 35 which straddle opening 33 when the main valve is closed. This prevents leakage of pressure from the main line when the main valve is closed.

It will be noted that the size of the movable wall or piston 27 of the first chamber is smaller than the movable wall or piston 28 of the second chamber. Thus, the upstream pressure exerted on piston 27 may be much greater than the downstream pressure exerted on piston 28 with the valve in open position. According to pressure conditions existing in the installation, the size of piston 27 is changed to give the desired area relationships for the pressure conditions existing. With the change in size of piston 27, the insert sleeve 36, which defines the cylinder for cooperation with piston 27, is changed. A suitable seal 30 seals between the insert 36 and piston 27.

From the valve as thus far explained, it will be apparent that with a predetermined pressure condition the valve member will remain open. Upon a break occurring in the downstream line, the pressure within chamber 26 will fall, while the pressure within chamber 25 will remain high. This will result in an unbalance of forces, and the motor operator piston 24 will move downwardly to seat the main valve.

On the other hand, if the pressure in the downstream line increases to an excessively high value, it is only necessary to have this increased pressure operate a pop-off valve to vent chamber 26 and also close the main valve.

Provisions for venting the chamber 26 upon an excessive downstream pressure are provided by a passageway 37 which communicates with the chamber 26 at a position which is always below the seal 35. This passageways leads to a conduit 38 which in turn is connected through pilot valve 17 to a relief valve 39. Relief valve 39 may be of any desired type, but is preferably a frangible disc which will rupture at a predetermined pressure.

Referring now to the pilot valve, a pilot valve body 41 is provided which is tubular in form and has its open end secured to the upper end of the motor housing 18. A suitable adapter 42 is provided between these two housings and carries seals 43 and 44 which seal between the two housings. The housings are secured together by a suitable nut 45.

The pilot housing has a bore indicated generally at 46 therethrough, and a valve member indicated generally at 47 is mounted for reciprocation within said bore.

A first opening is provided into said bore at 48 for conducting fluid pressure from the first chamber 25 to the bore. A second opening 49 is provided for conducting fluid pressure from the second chamber 26 through line 38 to the bore. A third opening 51 is provided and establishes communication between the bore and the relief means 39. A fourth opening 52 is provided in the bore which extends to the exterior of the pilot valve housing to provide a vent. It will be noted that the first, second, third and fourth openings are arranged in numerical order, and that suitable seals are provided between the several openings for selectively sealing between the valve member 47 and the bore. These seals include a seal 53 on the valve member for sealing between the first and second openings, a seal in the valve body at 54 for sealing between the second and third openings, and a seal 55 in the valve body for sealing between the third and fourth openings.

For convenience of manufacture, the bore through the body includes inserts 46a, 46b and 46c.

The upper end of the slide valve 47 is provided with a threaded extension 47a which is threadedly engaged by a nut 56. The nut 56 is non-rotatably carried by a hand wheel 57 which in turn is rotatably mounted on the pilot valve body. Rotation of the hand wheel rotates nut 56 to raise or lower the valve member as the valve member is held against rotation by the co-action of a guide 58 in the pilot valve housing extending into a vertical slot 59 in the valve member.

It will be noted that the valve member 47 has a reduced diameter portion 47b immediately above the sliding seal 53. Also, an increased diameter section 47c is provided above the reduced diameter portion 47b. This increased diameter portion 47c cooperates with seals 54 and 55 to control opening and closing of the third and fourth openings.

In operation, the hand wheel may be rotated to move the valve member downwardly until the portion 47c of the pilot valve member engages seal 54 which will isolate the third and fourth openings to the relief member 39 and the vent. Continued downward movement of the valve member will move seal 53 into an enlarged diameter portion of the bore insert 46a. This will permit fluid to flow from the first to the second chamber as the check valve 60 will be engaged by the lower end of the slide valve 47 and unseated at approximately the same time that seal 53 becomes ineffective. As the pressure in the first and second chambers will now be equalized, the main valve will be opened. While the pilot valve may remain in the position at which the main valve is opened if desired, it is preferred to return the pilot valve to automatic operation position to permit the control valve to function as such in the event that downstream pressure does not remain within a predetermined range. For this purpose the hand wheel is rotated to return the pilot valve to a second or intermediate position at which the first and fourth openings are closed, and the second and third openings are in communication. This is accomplished by moving the slide valve up to disengage seal 54 and stopping while the slide valve is in sealing engagement with seal 55. When moving from the open to automatic position, it is undesirable to have the high pressure used in opening the valve, and present in chamber 26, conveyed to the relief member 39, as this pressure will normally be sufficiently high to open the relief valve 39, and therefore effect automatic closing of the main valve. Therefore, the arrangement of seals is such that seal 53 closes the first opening before seal 54 between the second and third openings is uncovered to place the second and third openings in communication. Upon closing off of the source of pressure from the first chamber, the second chamber will begin to bleed down to downstream pressure through the line 32. Therefore, if a sufficient time delay is provided in moving the valve between a position at which the first opening is closed and a position at which the second and third openings are placed in communication, the pressure within the second chamber 26 will bleed down to a value which will not open the relief valve 39. This delay may be provided in any desired manner. In the illustrated embodiment the threads between the nut 56 and the portion 47a of the valve member are low-pitch, and, therefore, a sufficient number of turns will be required to move the valve member from the position at which the first opening is closed to the position at which the second and third openings are placed in communication to permit the pressure within chamber 26 to bleed down.

While the pilot valve is in this position, it will be appreciated that a drop in downstream pressure will unbalance the motor operator piston 24 and close the valve, and an increase in downstream pressure will open relief valve 39 which will vent chamber 26 and close the valve. The restriction 33 in the inlet line 32 is smaller than the conduits conducting pressure from the chamber 26, and therefore the pressure within this chamber will fall rapidly and permit the valve to close.

If it is desired to close the valve, the hand wheel is rotated to raise the valve member to a third position at which time the seal 55 is disengaged by the slide valve member to establish communication between the second opening 49 and the fourth opening 52. This will vent the second chamber 26 to atmosphere and permit the pressure trapped within the first chamber to move the valve member to closed position.

It will be noted that the hand wheel is provided with an indicator section 61 which cooperates with the upper end of the valve member to show the position of the pilot valve member. Also, a lock screw 62 is provided which may be utilized to lock the hand wheel in position.

Figure 3:
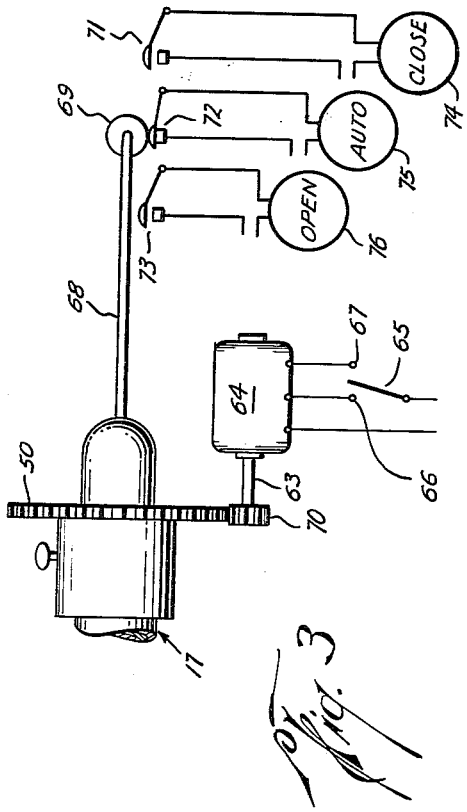
FIGURE 3 is a schematic illustration of a motor operator for the safety valve of FIGURE 1.

Referring now to FIGURE 3, there is shown a motor operator for controlling the position of the pilot valve from a remote location. In this embodiment of the invention the wheel 57 is provided with a peripheral spur gear 50 which is driven by a spur gear 70 on the arbor 63 of a reversible motor 64. The motor 64 is energized from a remote location by movement of the two-position switch 65 to engage either of contacts 66 or 67. Engagement of contact 66 rotates the motor in one direction, and engagement of contact 67 reverses the polarity of the motor to rotate it in the other direction, as will be understood by those skilled in the art. Thus the contacts 66 and 67 may be selectively engaged to move the pilot valve member between open, automatic and closed position.

To indicate at a remote point the position of the pilot valve, an indicator system is provided. An extension 68 is provided on the upper end of the slide valve member, and this extension carries a cam 69. The cam 69 is engageable with switches 71, 72 and 73 as it moves up and down with the pilot valve member. Leads from the switches 71, 72 and 73 extend to lights 74, 75 and 76, respectively, which are energized by closing of the switches with which they are associated. In this manner the operator is advised of the position of the pilot valve.

Of course, the motor may be set up for automatic operation if desired, and controlled merely by pushing a button to move the pilot valve to automatic or closed position, as will be understood by those skilled in the art. Where fully automatic operation is provided, it is preferred to move the slide valve member first to open position and then to automatic position when placing the valve on automatic operation, and not to provide a control which will move the slide valve to fully open position and maintain it in this condition.

Whether the safety valve is of the hand operated or motor operated type, it is preferred to provide in the adapter 19 a seal assembly indicated generally at 77 for cooperation with the valve stem 23. Immediately below the seal assembly a vent 78 is provided, and the valve stem 23 has a reduced diameter section 79. With the motor operator in up or valve open position, the full diameter portion of stem 23 engages seal 77 to seal therebetween. After the motor operator begins to move the valve toward closed position, the reduced diameter section 79 of the valve stem moves opposite the seal 77 and the chamber 26 is thus vented past the seal 77 through vent 79 to atmosphere. This assures that once the motor operator moves a short distance toward closed position, that the chamber 26 will be vented and the valve positively moved to closed position.

It will be noted that the pilot valve operator provided is one in which the safety device will "fail safe." The provision of a seal 53 for closing the first opening in combination with a check valve 60 provides a double seal against leakage of pressure from the first chamber. There are no external conduits conveying this pressure as the pilot valve body is connected directly to the motor housing over the first chamber. In the event of rupture of either of the external conduits 32 or 38, the chamber 26 will be vented and the valve will "fail safe" to closed position.

The foregoing disclosure and description of the inven- is illustrative and explanatory thereof and various changes in the size, shape and materials, as well as in the details of the illustrated construction, may be made within the scope of the appended claims without departing from the spirit of the invention.

What is claimed is:

1. In a pressure control apparatus having a main valve having a valve seat and valve member adapted to be connected in a line on the high pressure side of a choke, means for moving the valve member between open and closed position including a motor body member having therein two expansible chambers and opposed movable walls connected to each other and to the valve member, said wall of the first chamber being of smaller area than said wall of the second chamber, means conducting pressure from upstream of the valve seat to the first chamber, and passage means opening to the second chamber and adapted to receive pressure from downstream of the choke; the improvement comprising, a slide valve body; a bore in the slide valve body; a first opening in the bore adapted to communicate with the first chamber; a second opening in the bore adapted to communicate with the second chamber; a third opening in the bore in communication with pressure relief means which opens at a predetermined pressure; a fourth opening in the bore communicating with the exterior of the slide valve body and providing a vent; valve means movable axially in the bore; said valve means in a first position closing the third and fourth opening and establishing communication between the first and second openings whereby fluid pressure in the first chamber may flow into the second chamber to open the main valve; said valve means in a second position closing the first and fourth and establishing communication between the second and third openings whereby the pressure relief means will open upon the second chamber pressure exceeding a predetermined amount to effect closing of the main valve; said valve means when moving from the first to the second position closing the first opening before establishing communication between the second and third openings; said valve means in a third position closing the first opening and establishing communication between the second and fourth openings to vent the second chamber and effect closing of the main valve; and means for reciprocating the valve means between said three positions said reciprocating means including means providing a sufficient time delay between closing of the first opening and establishing communication between the second and third openings when moving the valve means from the first to the second position to permit pressure fluid within the second chamber to escape through the means for conducting downstream pressure to the second chamber and reduce the second chamber pressure to a value below that at which said pressure relief means will open.

2. The apparatus of claim 1 wherein the valve means is reciprocated by rotating a nut and said time delay is provided by low pitch threads on the nut.

3. The apparatus of claim 1 wherein the valve means includes a slide valve member which in both said second and third positions seals off said first opening from the remaining openings and a check valve which is seated in the first opening with the slide valve in said second and third positions and which is unseated by movement of the slide valve member to said first position.

4. The apparatus of claim 1 wherein reversible motor means are provided for rotating said nut.

5. The apparatus of claim 1 wherein the pressure relief means is a shear disc.

6. The apparatus of claim 1 wherein said openings are arranged in numerical order, the valve means includes a slide valve member having a seal thereon which sealingly engages said bore when the valve means is in the second and third positions and is in non-sealing position in an enlarged portion of said bore when the valve means is in the first position, seal means are provided in the bore between the second and third openings and between the third and fourth openings, and the slide valve member has a portion for sealingly engaging the seal between the third and fourth openings when in the second position and engaging the seal between the second and third opening when in the first position.

7. A slide valve comprising, a tubular body having a bore therein open at one end of the body, a slide valve member slidably mounted in said bore, means on the other end of the body for reciprocating the slide valve member from one extreme position through an intermediate position to another extreme position, a pair of spaced seal means in said bore, openings through the wall of said body on both sides of and intermediate said spaced seals, said valve member having a surface engaging said seal means when the valve member is in one extreme position and engaging one of said seal means only when the valve member is in said intermediate position, said surface positioned axially from and out of engagement with both of said seal means when the valve member is in said other extreme position, said valve member having a non-sealing section adjacent said seal surface which is spaced from said seal means to permit flow thereby when said section is opposite said seal means, said valve member having a seal support section on its extremity on the opposite side of the non-sealing section from said seal surface, seal means on said seal support section sealingly engaging said bore when said valve member is in said intermediate and other extreme positions, said bore having an enlarged section adjacent the open end of said bore non-sealingly receiving said last mentioned seal means when said valve member is in said one extreme position, said non-sealing section bridging said openings on both sides of and intermediate said spaced seals when the valve member is in said other extreme position and bridging the opening intermediate said spaced seals and one of the openings on one side of the spaced seals when in said intermediate position and bridging said last mentioned opening on one side of the spaced seals and said enlarged section of the bore when the valve member is in said other extreme position.

8. A pressure control apparatus comprising, a main valve having a valve seat and valve member adapted to be connected in a line on the high pressure side of a choke, means for moving the valve member between open and closed position including a motor body member having therein two expansible chambers and opposed movable walls connected to each other and to the valve member, said wall of the first chamber being of smaller area than said wall of the second chamber, means conducting pressure from upstream of the valve seat to the first chamber, passage means opening to the second chamber and adapted to receive pressure from downstream of the choke, a tubular slide valve body, a bore extending through the slide valve body, a first opening in the bore provided by one end of said bore, said tubular valve body sealingly secured to the motor valve body about said first opening in the bore with said first opening overlying an opening in the motor valve body in communication with the first chamber, a second opening in the bore in communication with the second chamber, a third opening in the bore in communication with pressure relief means which opens at a predetermined pressure, a fourth opening in the bore communicating with the exterior of the slide valve body and providing a vent, valve means movable axially in the bore, said valve means in a first position closing the third and fourth openings and establishing communication between the first and second openings whereby fluid pressure in the first chamber may flow into the second chamber to open the main valve, said valve means in a second position closing the first and fourth and establishing communication between the second and third openings whereby the pressure relief means will open upon the second chamber pressure exceeding a predetermined amount to effect closing of the main valve, said valve means when moving from the first to the second position closing the first opening before establishing communication between the second and third openings, said valve means in a third position closing the first opening and establishing communication between the second and fourth openings to vent the second chamber and effect closing of the main valve, and means for reciprocating the valve means between said three positions and when moving the valve means from the first to the second position providing a sufficient time delay between closing of the first opening and establishing communication between the second and third openings to permit pressure fluid within the second chamber to escape through the means for conducting downstream pressure to the second chamber and reduce the second chamber pressure to a value below that at which said pressure relief means will open.

9. A slide valve comprising, a tubular body having a bore therein open at one end of the body, a slide valve member slidably mounted in said bore, means on the other end of the body for reciprocating the slide valve member from one extreme position through an intermediate position to another extreme position, a pair of spaced seal means in said bore, openings through the wall of said body on both sides of and intermediate said spaced seals, said valve member having a surface engaging said seal means when the valve member is in one extreme position and engaging one of said seal means only when the valve member is in said intermediate position, said surface positioned axially from and out of engagement with both of said seal means when the valve member is in said other extreme position, said valve member having a non-sealing section adjacent said seal surface which is spaced from said seal means to permit flow thereby when said section is opposite said seal means, said valve member having a seal support section on its extremity on the opposite side of the non-sealing section from said seal surface, seal means on said seal support section sealingly engaging said bore when said valve member is in said intermediate and other extreme positions, said bore having an enlarged section adjacent the open end of said bore non-sealingly receiving said last mentioned seal means when said valve member is in said one extreme position, said non-sealing section bridging said openings on both sides of and intermediate said spaced seals when the valve member is in said other extreme position and bridging the opening intermediate said spaced seals and one of the openings on one side of the spaced seals when in said intermediate position and bridging said last mentioned opening on one side of the spaced seals and said enlarged section of the bore when the valve member is in said other extreme position, and means for reciprocating the valve member between said two extreme and said intermediate positions, said last mentioned means including means providing a time delay in shifting of said valve member between said positions.

References Cited in the file of this patent

UNITED STATES PATENTS

| | | |
|---|---|---|
| 1,316,585 | Logan | Sept. 23, 1919 |
| 1,513,457 | Jackson | Oct. 28, 1924 |
| 1,585,816 | Atherton | May 25, 1926 |
| 2,019,193 | Mueller | Oct. 29, 1935 |
| 2,141,847 | Tennant | Dec. 27, 1938 |
| 2,587,933 | Volpin | Mar. 4, 1952 |
| 2,684,689 | Nordin | July 27, 1954 |
| 2,693,819 | Otis | Nov. 9, 1954 |
| 2,812,775 | Hodgson | Nov. 12, 1957 |
| 2,910,050 | Dotter | Oct. 27, 1959 |
| 2,927,603 | Willis | Mar. 8, 1960 |